(12) United States Patent
Babu et al.

(10) Patent No.: US 11,370,317 B2
(45) Date of Patent: Jun. 28, 2022

(54) SYSTEMS AND METHODS FOR AUTOMATED ELECTRICAL CONNECTOR POSITIONING FOR ELECTRIC VEHICLE CHARGING

(71) Applicant: ABB Schweiz AG, Baden (CH)

(72) Inventors: Sree Shankar Satheesh Babu, Manchester, CT (US); Gregory A. Cole, West Hartford, CT (US); Martin Krucinski, Glastonbury, CT (US)

(73) Assignee: ABB Schweiz AG, Baden (CH)

( * ) Notice: Subject to any disclaimer, the term of this patent is extended or adjusted under 35 U.S.C. 154(b) by 111 days.

(21) Appl. No.: 16/579,265

(22) Filed: Sep. 23, 2019

(65) Prior Publication Data

US 2021/0086643 A1    Mar. 25, 2021

(51) Int. Cl.
*B60L 53/37* (2019.01)
*B60L 53/16* (2019.01)

(52) U.S. Cl.
CPC .............. *B60L 53/37* (2019.02); *B60L 53/16* (2019.02)

(58) Field of Classification Search
CPC ................................................ B60L 53/35–39
See application file for complete search history.

(56) References Cited

U.S. PATENT DOCUMENTS

| 2014/0067660 A1 | 3/2014 | Cornish |
| 2014/0354229 A1 | 12/2014 | Zhao et al. |
| 2017/0225582 A1* | 8/2017 | Augst ..................... B60L 53/36 |
| 2017/0225583 A1 | 8/2017 | Chai et al. |
| 2019/0176637 A1* | 6/2019 | Booth ..................... B60L 53/60 |
| 2020/0047623 A1* | 2/2020 | Zadrozny ................ B60L 53/38 |

FOREIGN PATENT DOCUMENTS

| GB | 2509720 A | 7/2014 | |
| WO | WO-2016096194 A1 * | 6/2016 | ............ B60L 53/305 |
| WO | WO 2019/139463 A2 | 7/2019 | |
| WO | WO 2019/172494 A1 | 9/2019 | |

OTHER PUBLICATIONS

Machine translation of WO2016096194A1 (Year: 2021).*
European Patent Office, International Search Report in International Patent Application No. PCT/IB2020/058430, 5 pp. (dated Nov. 12, 2020).
European Patent Office, Written Opinion in International Patent Application No. PCT/IB2020/058430, 10 pp. (dated Nov. 12, 2020).

* cited by examiner

*Primary Examiner* — David V Henze-Gongola
(74) *Attorney, Agent, or Firm* — Leydig, Voit & Mayer, Ltd.

(57) ABSTRACT

Systems, methods and software for automated electrical connector positioning for electric vehicle (EV) charging are provided. Using, for example, the disclosed automatic charging device, a method for charging an EV includes capturing an image of at least a portion of a pattern positioned in a fixed location in a landing zone of an EV-side electrical connector in a fixed position on or in an underside of the EV. The method includes determining, based on the image, a displacement of a charger-side electrical connector from an initial position to a final position, the final position corresponding to the charger-side electrical connector matingly engaged with the EV-side electrical connector. The method includes actuating the charger-side electrical connector from the initial position to the final position according to the displacement.

13 Claims, 7 Drawing Sheets

SYSTEMS AND METHODS FOR AUTOMATED ELECTRICAL CONNECTOR POSITIONING FOR ELECTRIC VEHICLE CHARGING

TECHNICAL FIELD

The present disclosure relates to charging systems and methods for electric vehicles and, more particularly, to systems and methods for automated positioning of electrical connectors between a vehicle charger and the vehicle.

BACKGROUND

Use of electrical vehicles is becoming increasingly popular due to the environmental benefits of removing pollution caused by fossil fuel burning vehicle engines from the environment, especially in densely populated urban environments. As with most mobile electrical devices, electrical vehicles carry electrical power storage devices or batteries, which provide power to the vehicle propulsion and other systems. As can be appreciated, the vehicle batteries require periodic recharging to provide consistent vehicle operation.

At present, electric vehicle recharging is a time consuming process that is typically carried out over long periods, for example, overnight or during prolonged periods when the electric vehicle is parked. Power dispensers include flexible conduits or wire bundles that include a connector at their end, which plugs into a vehicle receptacle and then begins the transfer of power from the dispenser the vehicle's battery.

Traditional vehicle power dispensers operate at around 200-240 Volts AC, and transfer about 30 Amp of electrical power into a vehicle. As a consequence, providing a full charge to a vehicle can take up to 10 hours or more. With the increase in popularity of electric vehicles, convenient and user-friendly charging solutions requiring little to no manual in on the part of users are desirable.

SUMMARY OF THE DISCLOSURE

In one aspect, the disclosure describes an automatic charging device (ACD) for an EV. The ACD includes a charger link having distal and proximal ends, and a charger-side electrical connector operably coupled to the charger link proximal the distal end of the charger link. The ACD includes at least one actuator operably coupled to the charger link proximal the proximal end of the charger link for moving the charger link distal end toward an EV-side electrical connector in a fixed position on or in an underside of the EV. The ACD includes at least one camera configured to provide a field of view directed toward a charging environment of the EV. The ACD includes one or more processors in communication with the actuator(s) and the camera(s). The processor(s) are configured to capture, using the camera(s), one or more image(s) of at least a portion of a pattern positioned in a fixed position in a landing zone of the EV-side electrical connector. The processor(s) are configured to determine, based on the image(s), a displacement of the charger-side electrical connector from an initial position to a final position, the final position corresponding to the charger-side electrical connector matingly engaged with the EV-side electrical connector. The processor(s) are configured to actuate, using the actuator(s), the charger-side electrical connector from the initial position to the final position according to the displacement.

In another aspect, the disclosure describes a method for charging an EV using, for example and without limitation, the disclosed ACD. In practice, the disclosed method may be performed, at least in part, as a computer-implemented method using the processor(s), actuator(s) and/or camera(s) of, for instance, the disclosed ACD. The method includes capturing, e.g., by the ACD processor(s) and using the ACD camera(s), an image of at least a portion of a pattern positioned in a fixed location in a landing zone of an EV-side electrical connector in a fixed position on or in an underside of the EV. The method includes determining, e.g., by the ACD processor(s), and based on the image, a displacement of a charger-side electrical connector from an initial position to a final position, the final position corresponding to the charger-side electrical connector matingly engaged with the EV-side electrical connector. The method includes actuating, e.g., by the ACD processor(s) and using the ACD camera(s), the charger-side electrical connector from the initial position to the final position according to the displacement.

In yet another aspect, the disclosure describes a non-transitory computer-readable storage medium. The non-transitory computer-readable medium has program instructions stored thereon, for example in the form of software and/or firmware. When executed by one or more processors of, for example and without limitation, the disclosed ACD, the program instructions cause the processor(s) and/or the ACD to: capture, e.g., using the ACD camera(s), an image of at least a portion of a pattern positioned in a fixed location in a landing zone of an EV-side electrical connector in a fixed position on or in an underside of the EV; determine, e.g., using the ACD processor(s), and based on the image, a displacement of a charger-side electrical connector from an initial position to a final position, the final position corresponding to the charger-side electrical connector matingly engaged with the EV-side electrical connector; and actuate, e.g., using the ACD actuator(s), the charger-side electrical connector from the initial position to the final position according to the displacement.

Further and alternative aspects and features of the disclosed principles will be appreciated from the following detailed description and the accompanying drawings. As will be appreciated, the principles related to devices, systems, and methods for automated electrical connector positioning for EV charging disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
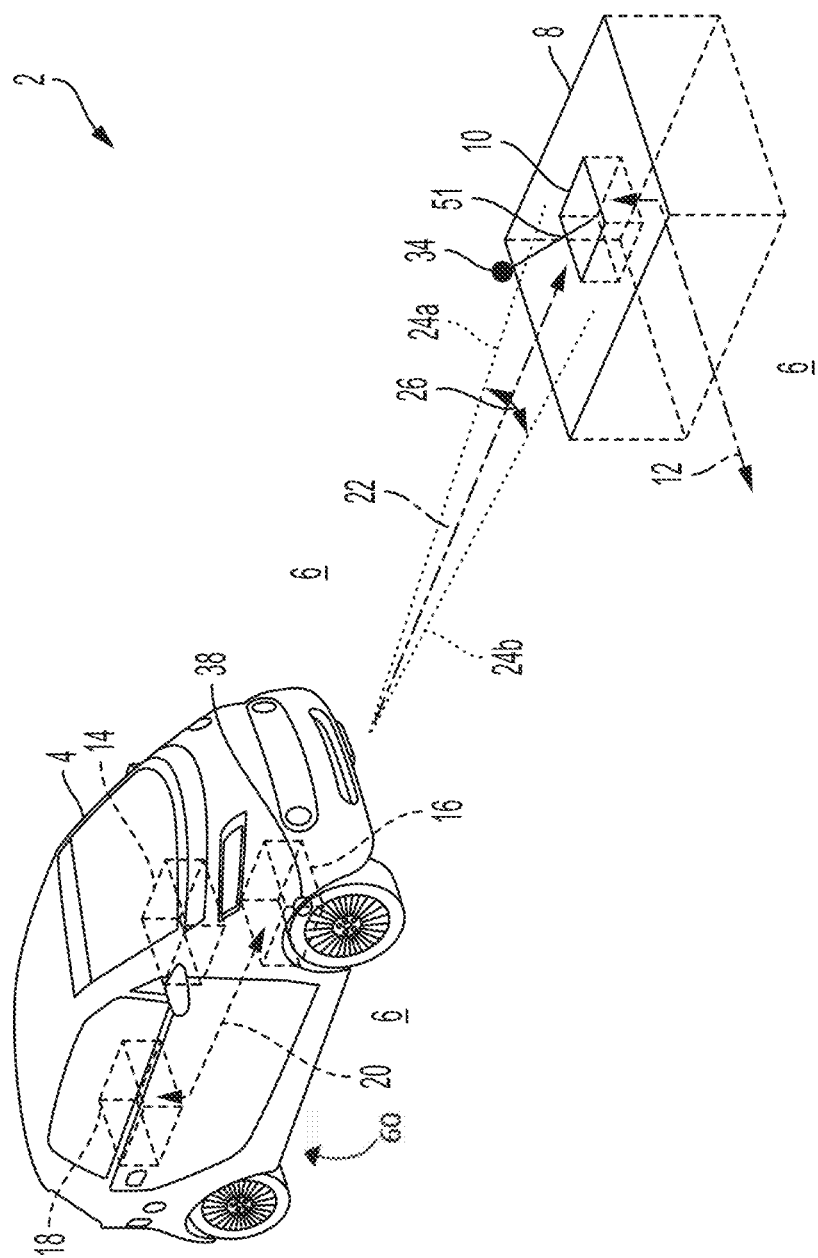
FIG. 1 is a perspective and schematic view of an electric vehicle (EV) charging environment including an automatic charging device (ACD) according to an embodiment of the disclosure.

FIG. 1 is a perspective view of an electric vehicle (EV) charging environment 2 according to an embodiment of the disclosure. In the example shown in FIG. 1, an EV 4 is positioned on a ground surface 6. EV 4 is a car, as shown in FIG. 1. Alternatively, EV 4 may be a truck, a motorcycle, a moped, a truck or bus, a scooter, a farm implement or any other on- or off-highway vehicle. In the example shown, ground surface 6 is a floor of a garage or other vehicle storage facility of a home or business. Alternatively, ground surface 6 may be a surface of a parking lot. Environment 2 includes an automatic charging device (ACD) unit 8. ACD 8 is positioned on or, at least in part, beneath ground surface 6. Depending on application, and also on the ground clearance of the EV 4, the ACD 8 may be fully or partially disposed beneath the ground surface, or may alternatively be disposed on the ground surface 6, for example, when installed on existing floors. ACD 8 includes a connector unit 10. At least a portion of connector unit 10 faces and is exposed, or exposable, to the space above ground surface 6. In embodiments wherein ACD 8 is positioned entirely on, and not at all in, or beneath, ground surface 6, connector unit 10 faces in the same generally upward direction as ground surface 6. ACD 8 is operatively coupled to or associated with an electric power source (e.g., a utility grid, not shown in FIG. 1), either directly or through a transforming, conditioning, and/or conversion device such as a transformer or converter. A first electric power flow 12 can thus be selectively enabled between power source and floor unit (e.g., ACD 8), including to connector unit 10.

EV 4 includes a drivetrain 14 providing motive power to the EV 4 for driving. EV 4 includes a vehicle unit 16 and at least one power storage device such as a battery 18. Battery 18 is operatively coupled to drivetrain 14 for providing electric power thereto to enable providing motive power for EV 4 selectively during operation. Structures and systems of the EV 4 that accomplish the provision of power to the drivetrain 14 selectively by an operator (not shown) of the EV 4 are omitted for simplicity. At least a portion of vehicle unit 16 faces and is exposed or exposable to ground surface 6. It is noted that, while the EV 4 is shown in one orientation as it approaches the floor unit (e.g., ACD 8), any orientation of approach is also contemplated. Vehicle unit 16 is operatively coupled to battery 18 to provide an interface for providing electrical power to charge the battery 18. When a charger-side electrical connector 34 is electrically coupled with an EV-side electrical connector 38, a second electric power flow 20 can thus be selectively enabled between the battery 18 and the grid power source, for instance.

In the EV charging environment 2 shown in FIG. 1, EV 4 is being driven and approaches the ACD 8. A driver of EV 4 (e.g., a human driver and/or an autonomous vehicle driving system, not shown in FIG. 1) steers or otherwise controls the EV 4 to approach ACD 8 along a centerline path 22. As shown in FIG. 1, centerline path 22 extends from EV 4 to at least approximately a center point of connector unit 10 proximal ground surface 6. Based on the particular dimensions and other specifications of EV 4, ACD 8, and/or vehicle unit 16, an approach path of EV 4 to ACD 8 may deviate from the target centerline path 22 by an allowable deviation 24. The allowable deviation may be in any direction, including but not limited to a horizontal or vertical direction. Allowable deviation 24 includes a driver side deviation 24a and a passenger side deviation 24b, for example. An allowable deviation angle 26 is defined between lines defining driver side deviation 24a and passenger side deviation 24b. In three dimensions, the deviation angle 26 may form a conical volume that accounts for height of ground clearance of the EV 4, as well pitch, yaw and roll of the EV 4's trajectory during the approach to the ACD 8, and also during the connection and charging operations.

Figure 2A:
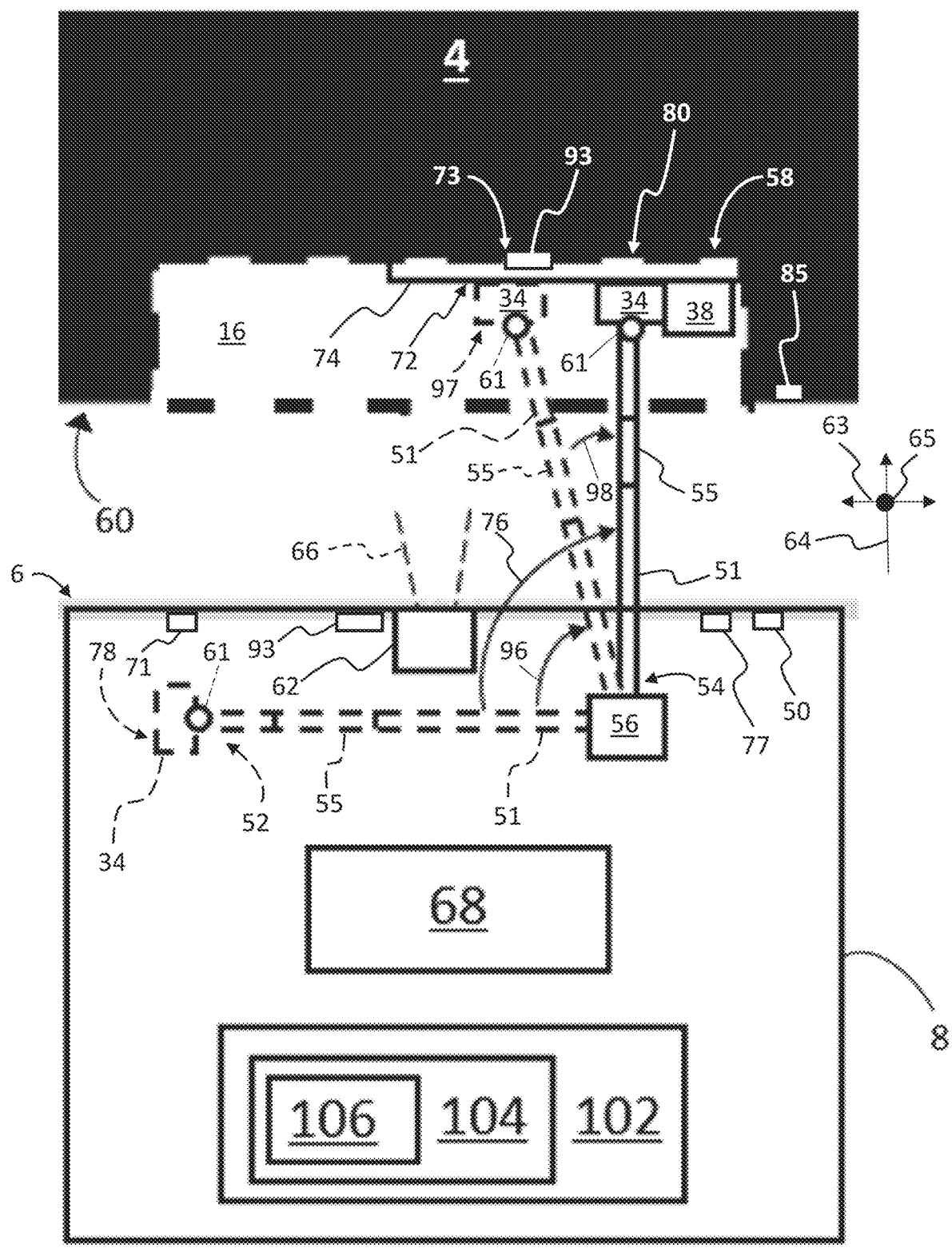
FIGS. 2A and 2B are respectively side and top plan view schematic diagrams of the ACD of FIG. 1 according to an embodiment of the disclosure.
Figure 2B:
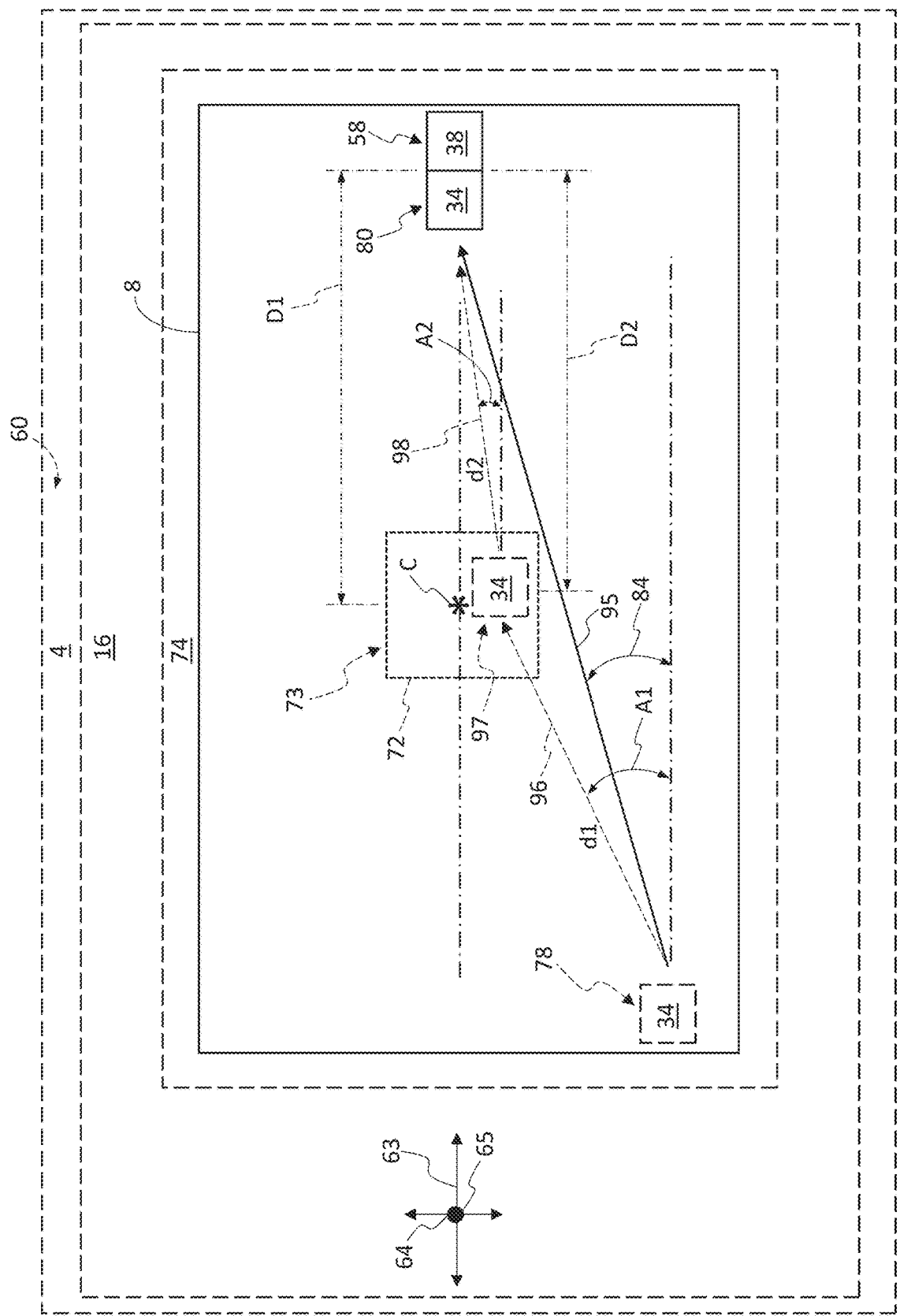
Figure 3:
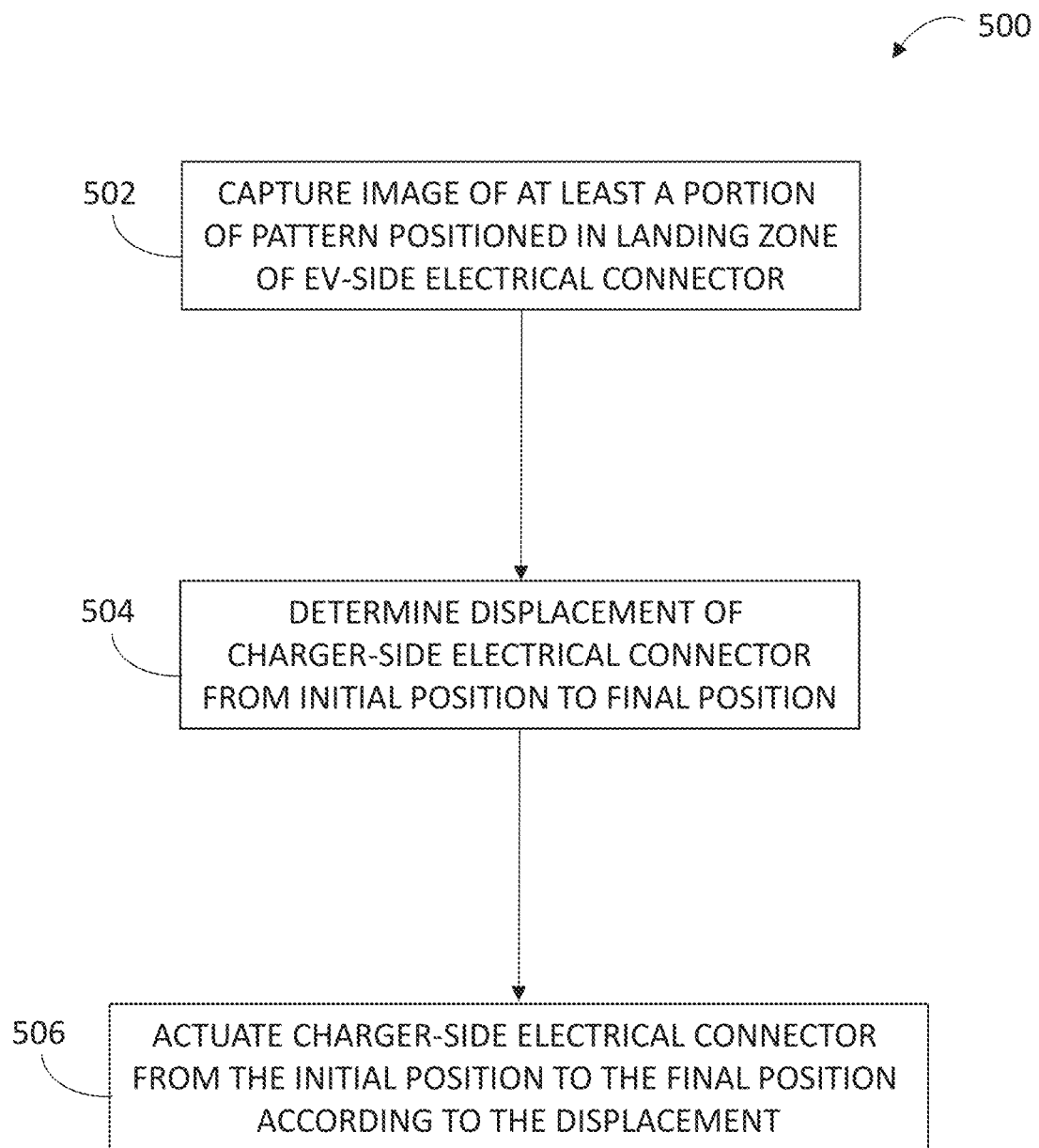
FIG. 3 is a flow chart illustrating steps of a method for charging an EV using the ACD of FIGS. 1 and 2 according to an embodiment of the disclosure.

FIGS. 2A and 2B are respectively side and top plan view schematic diagrams of the ACD 8 shown in FIG. 1 according to an embodiment of the disclosure. FIG. 3 is a flow chart illustrating steps of a method 500 for charging an EV 4 using the ACD 8 of FIGS. 1, 2A and 2B according to an embodiment of the disclosure. Any or all of the steps of method 500 described herein are implemented and performed, at least in part, by the ACD 8. ACD 8 includes a charger link 51 having a distal end 52 and a proximal end 54. A charger-side electrical connector 34 is operably coupled to the charger link 51 at or proximal to the distal end 52 of the charger link 51. ACD 8 includes at least one actuator 56 operably coupled to the charger link 51 at or proximal to the proximal end 54 of the charger link 51. Actuator(s) 56 are included in ACD 8 for alternately moving the charger link 51 distal end 52 toward and away from EV-side electrical connector 38, which in some embodiments, is present in or on EV 4 underside 60 in a fixed position 58. ACD 8 includes a camera 62 (or other imaging-type sensor) configured to provide a field of view 66 directed toward the EV 4 charging environment 2 when the camera 62 of the ACD 8 is positioned in the charging environment 2. In an example, camera 62 is configured to provide an upward pointing (e.g., along a perpendicular axis 64 that is, or approximately normal a plane defining ground surface 6 and/or a plane defining EV 4 underside 60) field of view 66 when the camera 62 of the ACD 8 is positioned in the charging environment 2. In another example, camera 62 is configured to provide a field of view 66 that is normal, or close to normal, to a plane defining a landing zone 74 of the EV-side electrical connector 38 in the vehicle unit 16 when the camera 62 of the ACD 8 is positioned beneath the EV 4 underside 60 in the charging environment 2. In one embodiment, camera 62 is positioned on or in the ACD 8. Instead, or alternatively, camera 62 is positioned in, on, or proximal to the distal end 52 of charger link 51.

ACD 8 includes at least one processor 68 coupled in communication with at least one memory device 102 for reading, writing, modifying, and/or deleting data for use in method 500. Processor 68, actuator 56, camera 62, and, in some cases, memory 102 are also operably coupled to an electric power source (not shown in FIG. 2). Processor 68 is operably coupled to actuator 56 and camera 62. In an example, ACD 8 includes a camera actuator (e.g., at least one single degree of freedom (DOF) actuator or at least one multi-DOF camera actuator, not shown) operably coupled to processor 68. In the example, camera 62 and camera actuator are positioned in charging environment 2 or elsewhere in charging environment 2, and are configured to provide a movable field of view 66 directed toward charging environment 2 when the camera 62 of the ACD 8 is positioned in the charging environment 2, where a vector sum of a centerline of the movable field of view 66 is along one or more of axes 63, 64 and 65. As used herein, the term "operably coupled in communication" means that two or more hardware components of the disclosed ACD 8 are capable of transmitting and/or receiving electrical and/or optical signals 27 to and/or from each other. Such signals are capable of encoding data of various types and for various purposes related to performance of method 500 according to the disclosure. This transmitting and/or receiving includes using either wired, wireless, or both types of data connections and/or data communication protocols. This transmitting and/or receiving also includes transmitting and/or receiving electrical and/or optical signals 27 either over very short distances (e.g., within the confines of the ACD 8 unit) and/or over distances spanning continents (e.g., transmitting and/or receiving data via the Internet or via satellites). In the latter case, ACD 8 may include one or more communication interfaces (e.g., transceivers, not shown) to communicate with computing and/or memory resources (e.g., server(s)) via wired or wireless communication networks and protocols including, for example, to carry out one or more steps of method 500 as described herein. A person having ordinary skill in the art will recognize and appreciate that any and all present, and yet to be contemplated wired and/or wireless data communication methods and protocols may, without undue experimentation, be employed for use in the disclosed method 500. Practice of method 500 using, for instance, ACD 8, with any such data communication methods and protocols is thus intended to fall within the scope of the present disclosure and the scope of the appended claims.

In one embodiment, memory 102 includes at least one non-transitory computer-readable storage medium 104 which store(s) program instructions (e.g., in the form of software 106 and/or firmware). In such embodiments, when executed by processor 68, the program instructions cause the processor 68, and/or the disclosed ACD 8 and its components, to implement, perform, and/or otherwise facilitate, at least in part, one or more of the steps of method 500, as disclosed herein. Memory 102 includes one or more data structures (not shown). Data structures in memory 102 store data received directly or indirectly from processor 68 during the course of performance of method 500. The data received and stored in data structure includes data input from users, servicers, developers, and/or administrators of ACD 8 to facilitate operation of ACD 8 in method 500.

Figure 4A:
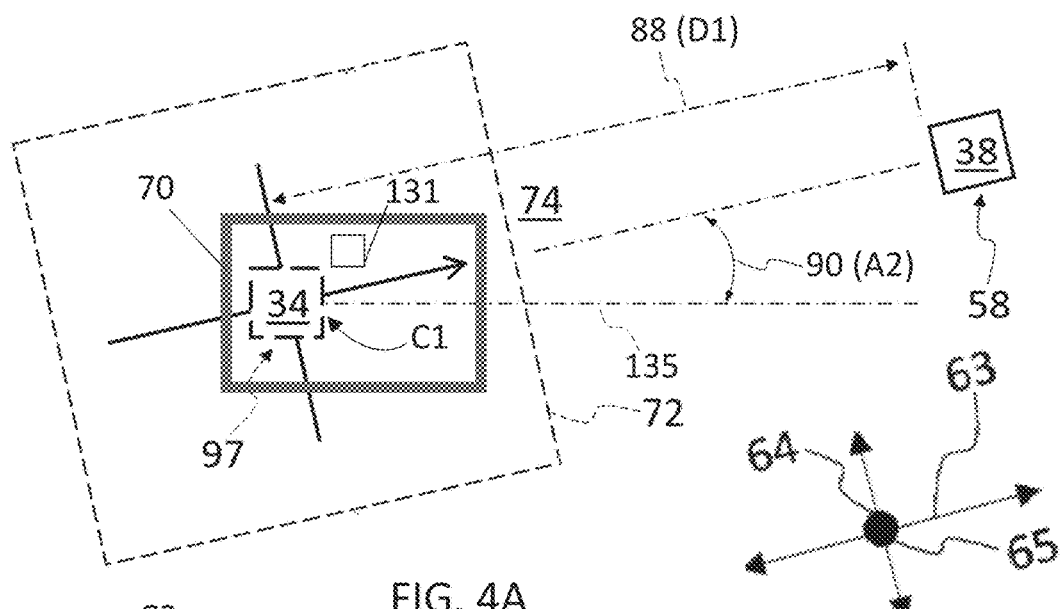
FIGS. 4A-4C are schematic diagrams illustrating aspects of the method of FIG. 1 implemented by the ACD of FIGS. 1, 2A and 2B according to embodiments of the disclosure.
Figure 4B:
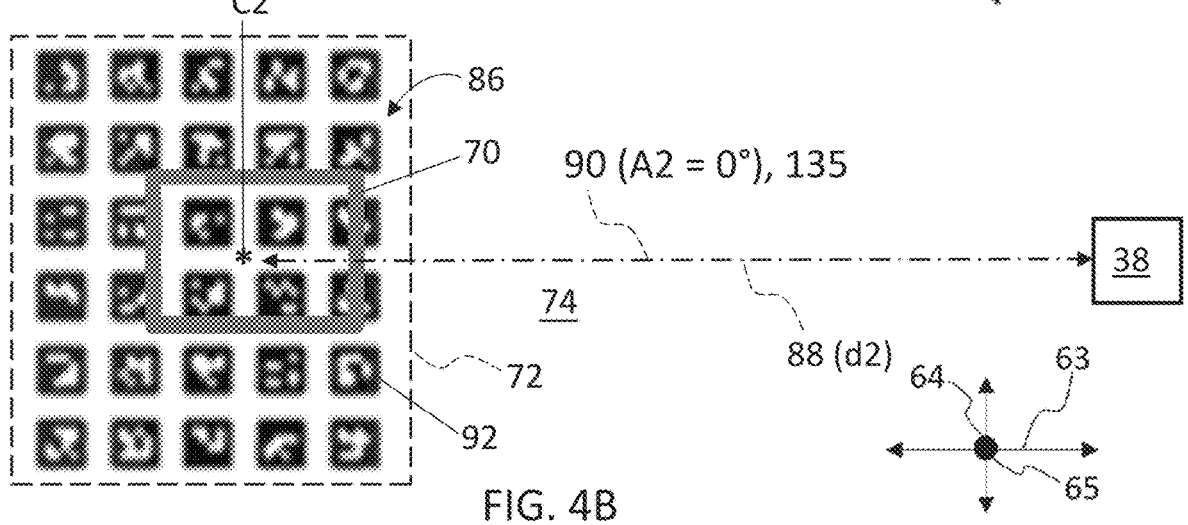
Figure 4C:
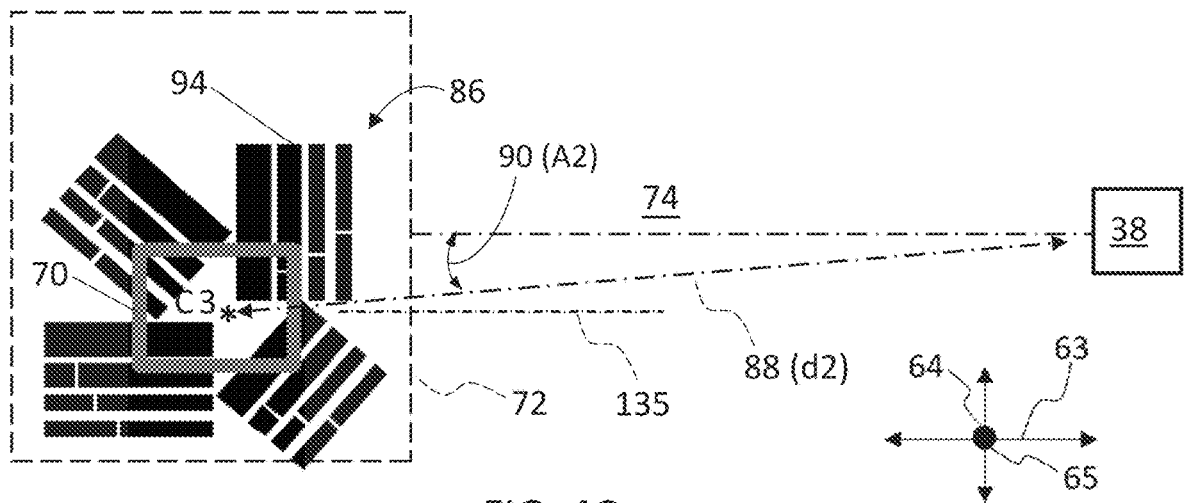

FIGS. 4A-4C are schematic diagrams illustrating aspects of the method 500 of FIG. 1 implemented by the ACD 8 of FIGS. 1, 2A and 2B according to embodiments of the disclosure. Referring to FIGS. 1, 2A, 2B, and 4A-4C, for performance of method 500, processor 68 captures 502, e.g., using the camera 62, one or more images 70 of at least a portion of a pattern 72 positioned in a fixed location 73 in the landing zone 74 of the EV-side electrical connector 38. Processor 68 causes the captured 502 image(s) 70 to be stored in transitory (a.k.a. volatile, e.g., RAM) and/or non-transitory (a.k.a. non-volatile, e.g., ROM) memory 102 for further use in method 500. In one embodiments, the landing zone 74 is included in vehicle unit 16 to provide a sturdy and flat surface upon which charger-side electrical connector 34 may, upon making contact with landing zone 74, slide along toward the EV-side electrical connector 38, as described in greater detail below by way of examples. In other embodiments, the vehicle unit 16 does not include landing zone 74 and charger-side electrical connector may instead transit through space between ground surface 6 and EV 4 underside 60 directly toward EV-side electrical connector 38 without contacting other parts of vehicle unit 16.

In embodiments in which the capturing 502 step of method 500 is performed, implemented, and/or facilitated, at least in part using software 106 or firmware, processor 68 executes program instructions stored as an image capturing module in the non-transitory computer-readable storage medium 104. Providing software 106 or firmware in a modular design is useful for purposes such as troubleshooting, maintenance, and providing updates for ACD 8, as used in method 500 for example. A person having ordinary skill in the art will recognize and appreciate that any and all present, and yet to be contemplated cameras and/or other imaging devices (e.g., based on visible light, IR, UV, etc.) may, without undue experimentation, be employed for use in the disclosed method 500. Practice of method 500 using, for instance, ACD 8, with any such cameras and other imaging devices for still image and/or video capture is thus intended to fall within the scope of the present disclosure and the scope of the appended claims.

Figure 5:
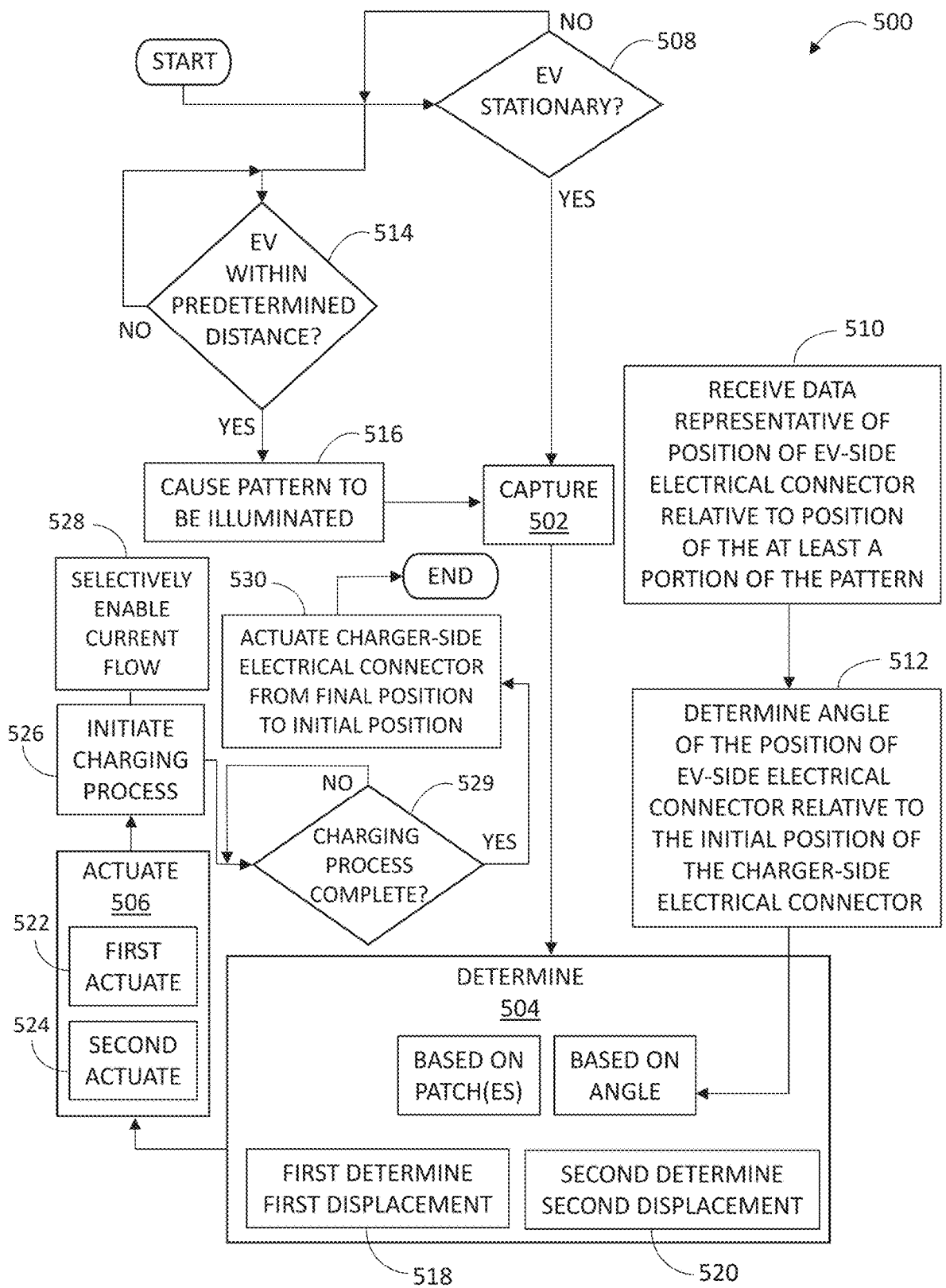
FIG. 5 is a flowchart of aspects of the method of FIG. 2 according to embodiments of the disclosure.

FIG. 5 is a flowchart of aspects of the method of FIG. 2 according to embodiments of the disclosure. Referring to FIGS. 1-5, in one embodiment, in method 500, processor 68 determines 508 that the EV 4 is stationary (as opposed to moving). In an example, processor 68 captures 502 the image(s) 70 in response to determining 508 that the EV 4 is stationary. This can help ensure that camera 62 obtains and transmits sharp and clear image(s) 70 to processor 68 for use in method 500, as described herein. In an example, ACD 8 includes motion sensor(s) 77 coupled in communication with processor 68 for purposes of accomplishing the determining 508 step in method 500. In another example, for the capturing 502 step of method 500, processor 68 uses camera 62 for video (as opposed to still image) capture, and processor 68 determines 508 that the EV 4 has ceased moving based on the captured 502 video data. In embodiments in which the determining 508 step of method 500 is performed, implemented, and/or facilitated, at least in part using software 106 or firmware, processor 68 executes program instructions stored as an EV movement determining module in the non-transitory computer-readable storage medium 104. A person having ordinary skill in the art will recognize and appreciate that any and all present, and yet to be contemplated sensors, and other hardware components and related techniques for detecting motion, or lack thereof, may, without undue experimentation, be employed for use in the disclosed method 500. Practice of method 500 using, for instance, ACD 8, with any such sensor, hardware, and/or techniques for motion detection is thus intended to fall within the scope of the present disclosure and the scope of the appended claims.

In one embodiment, in method 500, processor 68 determines 514 that the EV-side electrical connector 38 is within a predetermined distance 95 from the charger-side electrical connector 34. In one embodiment, the predetermined distance 95 is or includes a distance that is sufficient to permit, or provide ample time for, ACD 8 to initiate and complete the various operations of the disclosed method 500. In another embodiment, ACD 8 processor 68 initiates the various operations of method 500 in response to detecting that a wireless data connection has been established with one or more components of EV 4 associated with vehicle unit 16, and that are necessary to accomplish the coupling of charger-side electrical connector 34 to EV-side electrical connector 38 for successful EV 4 charging. To similarly beneficial ends as determining 508 that the EV 4 is stationary, inclusion of the determining 514 step in method 500 can help ensure that at least some of steps of method 500 are not performed prematurely (e.g., before the EV 4 and the EV-side electrical connector 38 arrives in close enough proximity to ACD 8). Likewise, one or more of the disclosed components of ACD 8 may be maintained in a sleep or low-power mode or state, and may be woken up upon processor 68 determining 514 that EV-side electrical connector 38 is within the predetermined distance 95 from charger-side electrical connector 34, thereby conserving power, computing, memory, and/or network bandwidth resources. For example, ACD 8 and/or processor 68 wakes from a sleep or low-power state upon sensor 77 (e.g., proximity sensor 77) transmitting a signal to processor 68 that is representative of at least a portion of EV 4 being within, for instance, 1.5 meters of charger-side electrical connector 34 which, by virtual of known fixed relative positioning (e.g., along axes 63, 64 and 65) of the at least a portion of EV 4 and a fixed position of EV-side electrical connector 38, equates to connector 38 being within 1.7 meters (e.g., the predetermined distance 95) from connector 34. In an embodiment, a value of the predetermined distance 95 is selected by a user, developer, servicer, and/or administrator of ACD 8 accordingly to the EV 4 and/or vehicle unit 16 specifications for which ACD 8 is, or will be, used. A predetermined distance 95 value is stored in memory 102 for use in at least the determining 514 step of method 500 and may be updated by user, developer, servicer, and/or administrator, as needed (e.g., a user purchases a new, or additional, EV 4 and/or vehicle unit 16 for use with ACD 8).

In one example, ACD 8 includes proximity sensor(s) 50 including, without limitation, laser range-finders, coupled in communication with processor 68 for purposes of accomplishing the determining 514 step in method 500. In another example, for the determining 514 step of method 500, processor 68 uses a receiver 71 for Bluetooth, near field communication (NFC), and any other suitable radio frequency (RF) signals to receive the signals from a paired wireless transmitter 85 positioned proximal the EV-side electrical connector 38. In yet another example, receiver 71 is or includes a microphone and transmitter 85 is or includes a speaker or other device capable of transmitting sound waves into charging environment 2. In this example, for the determining 514 step of method 500, processor 68 uses microphone receiver 71 for sound wave (e.g., ultrasonic or other sound wavelength(s) not readily perceived by human beings and/or their pets) signals to receive the signals from speaker transmitter 85 positioned proximal the EV-side electrical connector 38, In such examples, signals from the transmitter 85 may be received by receiver 71 upon transmitter 85 reaching a relevant range from receiver 71, thereby indicating to processor 68 that predetermined distance 95 has been attained. The signals from transmitter 85 received by receiver 71 may be further used by processor 68 to facilitate localization of EV-side electrical connector 38 relative to charger-side electrical connector 34 in EV 4 charging environment 2 according to the disclosed method 500. In embodiments in which the determining 514 step of method 500 is performed, implemented, and/or facilitated, at least in part using software 106 or firmware, processor 68 executes program instructions stored as a predetermined distance determining module in the non-transitory computer-readable storage medium 104. A person having ordinary skill in the art will recognize and appreciate that any and all present, and yet to be contemplated sensors, range-finders, and other hardware and/or communication components and related techniques for detecting and/or measuring distances may, without undue experimentation, be employed for use in the disclosed method 500. Practice of method 500 using, for instance, ACD 8, with any such sensor, range-finder, hardware, communication components, and/or techniques for distance detection and/or measurement is thus intended to fall within the scope of the present disclosure and the scope of the appended claims.

In one embodiment, in method 500, processor 68 causes 516 at least a portion of the pattern 72 to be illuminated to facilitate capturing 502 the image(s) 70. As with the determining 508 step, processor 68 causing 516 at least a portion of the pattern 72 to be illuminated can help ensure that camera 62 obtains and transmits sharp and clear image(s) 70 to processor 68 for use in method 500, as described herein. In one embodiment, in method 500, processor 68 causes 516 the pattern to be illuminated in response to determining 514 that the EV 4 and/or the EV-side electrical connector 38 is within the predetermined distance 95 from the charger-side electrical connector 34 and/or another point on, in or proximal to the ACD 8. For instance, processor 68 causes 516 the pattern to be illuminated upon sensor 77 (e.g., proximity sensor 77) transmitting a signal to processor 68 indicating that at least a portion of EV 4 is within, for instance, 1 meter of charger-side electrical connector 34 which, by virtue of known fixed relative positioning (e.g., along axes 63, 64 and 65) of the at least a portion of EV 4 and the fixed position of EV-side electrical connector 38, equates to connector 38 being within 1.3 meters (e.g., the predetermined distance 95) from connector 34.

In one example, ACD 8 includes one or more LED, fluorescent, and/or incandescent lamp(s) 93 for purposes of accomplishing the causing 516 step in method 500. Lamp(s) 93 are positioned in, on, or proximal to ACD 8 to provide light (visible or otherwise) to a portion of vehicle unit 16 including at least a portion of the pattern 72. For this purpose, ACD 8 lamp(s) 93 are electrically coupled to ACD 8 power supply and ACD 8 further includes analog and/or digital circuitry and hardware components (not shown) to enable lamp(s) 93 to be switched on and off on command.

In another example, lamp(s) 93 are positioned in, on, or proximal to vehicle unit 16 either instead of, or in addition to, the aforementioned lamp(s) 93 of ACD 8. When present in vehicle unit 16, lamp(s) 93 are electrically coupled to a power supply such as the EV 4 battery 18. In an example, receiver 71 of the ACD 8 also is capable of functioning as a transmitter (e.g., as a transceiver) and, upon the EV 4 and/or the EV-side electrical connector 38 being determined 514 to be within the predetermined distance 95, processor 68 causes a control signal to be transmitted using the transceiver 71 to, for instance, transmitter 85 of vehicle unit 16 (e.g., which is also capable of functioning as a transceiver). Upon receipt of the control signal by transceiver 85, controller circuitry (not shown) in the vehicle unit 16 switches vehicle unit 16 lamp(s) to an on (e.g., illuminated as a result of having electric power transmitted to them).

In one embodiment, vehicle unit 16 lamp(s) 93 are positioned behind the pattern 72. Referring to FIG. 4A, in one example, the pattern 72 is or includes a pair of crossed lines, where one line positioned along a longitudinal axis 63 of the EV 4 has an arrow at the end facing the EV-side electrical connector 38. The second line of the pair of crossed lines is positioned along a transverse axis 65 of the EV 4 and intersects the longitudinal line at a point at or near the center point (denoted "C1" in FIG. 4A) of the longitudinal line, as shown in FIG. 4A, where point C1, and/or a tip of the arrowhead shown in FIG. 4A, is positioned at a known, predetermined distance (e.g., D1), and at a 90 degree angle with respect to a transverse axis 65 of EV 4, from the fixed position 58 of EV-side electrical connector 38. The pattern shown in FIG. 4A is backlit by vehicle unit 16 lamp(s) 93. To facilitate this backlighting of pattern 72, the pattern 72 of FIG. 4A is cut into the material of construction of landing zone 74 as for example, by machining or laser cutting. Alternatively, or instead, the landing zone 74 is at least partly made of an optically transparent or translucent material of construction and the pattern 72 shown in FIG. 4A is either the part of landing zone 74 that is transparent or translucent, or it is a part of landing zone 74 that is non-transparent or non-translucent. The pattern 72 of FIG. 4A may instead be displayed on, for example, and LCD screen positioned in the fixed location 73 in or on landing zone 74. In any event, the pattern 72 of FIG. 4A is formed in or on landing zone 74 is a manner that facilitates camera 62 being used by processor 68 to capture 502 images(s) 70 of at least a portion of the pattern 72 for use in method 500, as disclosed herein.

Referring to FIG. 4B, in another example, the pattern 72 is or includes a plurality of unique patches 86, where each patch 86 of the plurality of unique patches 86 uniquely encodes the location 88 (e.g., defined by a distance d2) and orientation 90 (e.g., defined by an angle A2) of the at least a portion of the pattern 72 in image 70 relative to the fixed position 58 of EV-side electrical connector 38. For instance, as shown in FIG. 4B, where a captured 502 image 70 of pattern 72 and/or the plurality of patches 86 is or includes four whole squares of AprilTags 92, processor 68 determines a center point (denoted "C2" in FIG. 4B) with respect to the four whole AprilTags 92, and the portion of pattern 72 including point C2 thus defines the location 88 (e.g., d2) and orientation 90 (e.g., A2) relative to fixed position 58 of EV-side electrical connector 38. In another embodiment, each AprilTag 92 itself uniquely encodes positional (e.g., distance) and orientation (e.g., angle) data for respective AprilTag(s) 92 (e.g., a center thereof) relative to the fixed position 58 of the EV-side electrical connector 38. The AprilTag(s) 92 of pattern 72 shown in FIG. 4B is backlit by vehicle unit 16 lamp(s) 93. To facilitate this backlighting of pattern 72, the pattern 72 of FIG. 4B is cut into the material of construction of landing zone 74 as for example, by machining or laser cutting. Alternatively, or instead, the landing zone 74 is at least partly made of an optically transparent or translucent material of construction and the pattern 72 shown in FIG. 4B is either the part of landing zone 74 that is transparent or translucent, or it is a part of landing zone 74 that is non-transparent or non-translucent. The pattern 72 of FIG. 4B may instead be displayed on, for example, and LCD screen positioned in the fixed location 73 in or on landing zone 74. In any event, the pattern 72 of FIG. 4B is formed in or on landing zone 74 is a manner that facilitates camera 62 being used by processor 68 to capture 502 images(s) 70 of at least a portion of the AprilTags 92 pattern 72 for use in method 500, as disclosed herein.

Referring to FIG. 4C, in yet another example, the pattern 72 and/or the plurality of unique patches 86 is or includes a plurality of fractal features 94. For instance, as shown in FIG. 4C, where a captured 502 image 70 includes four adjacent portions (e.g., corners) of fractal features 94, processor 68 determines a center point (denoted "C3" in FIG. 4C) with respect to the four adjacent portions of fractal features 94, and the portion of pattern 72 including point C3 thus defines the location 88 (e.g., d2) and orientation 90 (e.g., A2) relative to fixed position 58 of EV-side electrical connector 38. In another embodiment, each fractal feature 94 itself uniquely encodes positional (e.g., distance) and orientation (e.g., angle) data for respective fractal feature(s) 94 (e.g., a center thereof) relative to the fixed position 58 of the EV-side electrical connector 38. The fractal features 94 of pattern 72 shown in FIG. 4C is backlit by vehicle unit 16 lamp(s) 93. To facilitate this backlighting of pattern 72, the pattern 72 of FIG. 4C is cut into the material of construction of landing zone 74 as for example, by machining or laser cutting. Alternatively, or instead, the landing zone 74 is at least partly made of an optically transparent or translucent material of construction and the pattern 72 shown in FIG. 4C is either the part of landing zone 74 that is transparent or translucent, or it is a part of landing zone 74 that is non-transparent or non-translucent. The pattern 72 of FIG. 4C may instead be displayed on, for example, and LCD screen positioned in the fixed location 73 in or on landing zone 74. In any event, the pattern 72 of FIG. 4C is formed in or on landing zone 74 is a manner that facilitates camera 62 being used by processor 68 to capture 502 images(s) 70 of at least a portion of the fractal features 94 pattern 72 for use in method 500, as disclosed herein.

In still another example, the pattern 72 and/or plurality of unique patches 86 is or includes optical fiducials. Optical fiducials are an optically visible pattern with a known unique geometry, such that when observed by camera 62 or other (e.g., imaging type) sensor 77, can be identified and tied to a specific position relative to another point or area. For example, processor 68 uses image processing algorithm(s) to extract such positional data from distortions in the camera 62 field of view 66 to obtain information about a position of one or more of the optical fiducials relative to the charger-side 34 and/or EV-side 38 electrical connector(s) 38, and with respect to one or more of axes 63, 64 and 65. AprilTags 92 are an example of optical fiducials. To form the pattern 72, optical fiducials like AprilTags 92 may either be printed on or near landing zone 74, or may be embodied in a backlit pattern 72 as, for instance, by etching or cutting the pattern 72 into the landing zone 74, with map(s) 93 positioned on a side of a landing zone 74 surface opposite a ground surface 6-facing surface thereof.

In yet another example, the pattern 72 and/or the plurality of unique patches 86 is or includes geometrically unique lighting. In the example, the pattern 72 taking the form of geometrically unique lighting is projected onto landing zone 74 (e.g., from beneath EV 4 underside 60) and/or is provided by the lamp(s) 93 positioned on the side of landing zone 75 opposite its ground surface 6-facing surface, as described above for backlighting optical fiducials. In one embodiment, if camera 62 does not have a direct line of sight with pattern 72 embodied in lighting (e.g., backlighting) provided by EV 4 side lamp(s) 93, sensor(s) 77 positioned on the ground surface 6 side (e.g., at or near ACD 8) may be used to detect the light for purposes of moving camera 62 toward a position providing the direct line of sight for the camera 62 field of view 66. In such embodiments, the sensing of actively emitted light by lamp(s) 93 on the EV 4 side for purposes of providing pattern 72 is specific to those wavelength(s) of light so emitted. This facilitates pattern 72 registration and subsequent image processing by processor 68 in method 500 where, for example, ambient light of other wavelengths (e.g., visible light) is present in charging environment 2.

In still another embodiment, the pattern 72 and/or the plurality of unique patches 86 is or includes radiant emitters, for example, and without limitation, electromagnetic coils and/or speakers (or other devices capable of transmitting sound waves into charging environment 2), which are arranged and/or placed or positioned in, on or proximal to landing zone 74 and/or EV-side electrical connector 38. In one embodiment, the pattern 72 and/or the plurality of unique patches 86 includes one, or any combination of: the optical fiducials, the geometrically unique lighting, the radiant emitters, and the plurality of fractal features 94.

In embodiments in which the causing 516 step of method 500 is performed, implemented, and/or facilitated, at least in part using software 106 or firmware, processor 68 executes program instructions stored as an illumination module in the non-transitory computer-readable storage medium 104. A person having ordinary skill in the art will recognize and appreciate that any and all present, and yet to be contemplated lamps, bulbs, lights, and/or other devices and systems capable of directing light (visible, IR, UV, etc.) from a point or area in one place to surface(s) of another location may, without undue experimentation, be employed for use in the disclosed method 500. Practice of method 500 using, for instance, ACD 8, with any such lamps, bulbs, lights, and/or other devices and systems capable of directing light is thus intended to fall within the scope of the present disclosure and the scope of the appended claims.

In method 500, processor 68 determines 504, based on the image(s) 70, a displacement 76 of the charger-side electrical connector 34 from an initial position 78 (e.g., in, on, or proximal to ACD 8) to a final position 80. The final position 80 corresponds to the charger-side electrical connector 34 matingly engaged with the EV-side electrical connector 38, as shown in FIGS. 2A and 2B. This matingly engaged state as between the charger-side 34 and EV-side 38 electrical connectors is required for the safe and effective transmission of first electric power flow 12 (as shown in FIG. 1) for purposes of charging the EV 4 battery, or, alternatively, providing (e.g., selling) power back to the utility by reversing the direction of flow 12. In an example, processor 68 causes the image(s) 70 to be stored in memory 102, and uses one or more image processing algorithms for the determining 504 step in method 500. The image processing algorithm(s) take as input the fixed position 58 of the EV-side electrical connector 38, the position 88 (e.g., distance d2) and orientation 90 (e.g., angle A2) of the at least a portion of the pattern 72 in the fixed location 73 in or on landing zone 74 of vehicle unit 16 as reflected in the captured 502 (and stored) image(s) 70. Using the captured 502 image(s) 70 and/or captured 502 video frame(s) containing data representative of the image(s) 70, the processor 68 uses the image processing algorithm(s) to compute the initial position 78 of charger-side electrical connector 34 relative to the fixed position 58 of EV-side electrical connector 38, and using the results of such computations, processor 68 determines 504 the necessary displacement 76 of connector 34 to attain the final position 80. In an example, the determined 504 displacement 76 is or includes linear displacement(s) (e.g., along distance 95, as shown in FIG. 2B), angular displacement(s) (e.g., displacement 76 through angle 84, as shown in FIG. 2A), and combinations thereof. In embodiments in which the determining 504 step of method 500 is performed, implemented, and/or facilitated, at least in part using software 106 or firmware, processor 68 executes program instructions stored as a displacement determining module in the non-transitory computer-readable storage medium 104.

In method 500, processor 68 actuates 506, using one or more actuator(s) 56, the charger-side electrical connector 34 from the initial position 78 to the final position 80 according to the displacement 76 determined in the determining 504 step of method 500. In one embodiment, actuator 56 operably coupled to proximal end 54 of charger link 51 is an electrical (e.g., DC or AC) motor. In another embodiment, this actuator 56 is a hydraulic actuator. In yet another embodiment, this actuator 56 is an electrical or hydraulic linear actuator. In still another embodiment, actuator 56 operably coupled to charger link 51 proximal end 54 is, or includes, a combination of two or more of electric motor(s), hydraulic actuator(s), and electrical and/or hydraulic linear actuator(s).

In some embodiments, ACD 8 includes additional, or alternative, actuator(s) 56 beside actuator 56 operably coupled to charger link 51 and/or charger-side electrical connector 34, as described in greater detail below by way of examples. In any event, actuator(s) 56 is/are configured in ACD 8 for alternately moving the charger link 51 distal end 52 toward and away from EV-side electrical connector 38, so as to facilitate respectively reaching and retracting from, the final position 80 of charger-side electrical connector 34. In embodiments in which the actuating 506 step of method 500 is performed, implemented, and/or facilitated, at least in part using software 106 or firmware, processor 68 executes program instructions stored as an actuating module in the non-transitory computer-readable storage medium 104. A person having ordinary skill in the art will recognize and appreciate that any and all present, and yet to be contemplated actuators and/or other devices and systems capable of moving charger link 51 and/or charger-side electrical connector 34 toward and away from EV-side electrical connector 38 may, without undue experimentation, be employed for use in the disclosed method 500. Practice of method 500 using, for instance, ACD 8, with any such actuators and/or other devices and systems capable of moving charger link 51 and/or charger-side electrical connector 34 toward and away from EV-side electrical connector 38 is thus intended to fall within the scope of the present disclosure and the scope of the appended claims.

In one embodiment, in method 500, after the charger-side electrical connector 34 is actuated 506 from the initial position 78 to the final position 80, processor 68 causes a flow (12, 20) of electric current to be initiated 526 from the power source (e.g., utility grid) through the matingly engaged charger-side 34 and EV-side 38 electrical connectors to a power storage device 18 of the EV 4. For this purpose, ACD 8 further includes analog and/or digital circuitry and hardware components (not shown) to enable (e.g., switch, on command) the flow (12, 20) to be transmitted from the power source (e.g., grid) through a conductor (e.g., a bus) positioned in or on charger link 51 and through charger-side electrical connector 34 and then on to EV-side electrical connector 38 to charge EV 4 battery 18. In an example, performance of the initiating 526 step in method 500 includes initiating 526, by the processor 68, an EV 4 charging process by selectively enabling 528 the flow (12, 20) of electric current from the power source through the matingly engaged charger-side 34 and EV-side 38 electrical connectors to the EV 4 power storage device 18. In embodiments in which the initiating 526 and/or selectively enabling 528 step(s) of method 500 is/are performed, implemented, and/or facilitated, at least in part using software 106 or firmware, processor 68 executes program instructions stored as an initiating module and/or selectively enabling module in the non-transitory computer-readable storage medium 104.

In one embodiment, in method 500, after initiating 526 the EV 4 charging process, processor 68 determines 529 a presence of one or more conditions representative of completion of the EV 4 charging process. In an example, a battery 18 state of charge, voltage and/or additional or alternative measurable (e.g., by sensor(s) (not shown) of vehicle unit 16) physical parameters of battery 18 that may change over the course of battery 18 being charged during the EV 4 charging process, may be transmitted to processor 68 (e.g., by transmitter 85 to be received by receiver 71). In such examples, processor 68 determines 529 that battery 18 is charged and that the condition(s) representative of completion of EV 4 charging process is complete based on received values of the battery 18 physical parameters. In embodiments in which the determining 529 step of method 500 is performed, implemented, and/or facilitated, at least in part using software 106 or firmware, processor 68 executes program instructions stored as an EV charging process completion determining module in the non-transitory computer-readable storage medium 104. A person having ordinary skill in the art will recognize and appreciate that any and all present, and yet to be contemplated sensors and/or other devices and systems capable of measuring, detecting and/or transmitting battery 18 physical parameters that may change during charging of battery 18 may, without undue experimentation, be employed for use in the disclosed method 500. Practice of method 500 using, for instance, ACD 8, with any such sensors and/or other devices and systems capable of measuring, detecting and/or transmitting battery 18 physical parameters that may change during charging of battery 18, and whether they are positioned in, on, or proximal to ACD 8, in or on EV 4 (e.g., vehicle unit 16), or both, is thus intended to fall within the scope of the present disclosure and the scope of the appended claims.

In one embodiment, in method 500, processor 68 actuates 530, using actuator(s) 56, the charger-side electrical connector 34 from the final position 80 to the initial position 78 according to a reverse sequence of the displacement 76 determined in the determining 504 step of method 500. In an example, processor 68 performs the actuating 530 step in method 500 in response to processor 68 determining 529 the presence of the condition(s) representative of completion of the EV 4 charging process. In embodiments in which the actuating 530 step of method 500 is performed, implemented, and/or facilitated, at least in part using software 106 or firmware, processor 68 executes program instructions stored as a return actuating module in the non-transitory computer-readable storage medium 104.

To further illustrate aspects of the embodiments described above, the following use cases are presented and discussed below with reference to FIGS. 1-5.

Example 1

The pattern 72 positioned on landing zone 74 of vehicle unit 16 is caused by processor 68 to be backlit upon the processor 68 determining that the charger-side electrical connector 34 is within the predetermined distance 95 from the EV-side electrical connector 38. The image of FIG. 4A is captured 502 concurrently with, or shortly after, the processor 68 causing the pattern 72 to be illuminated. Referring to FIG. 5, for this Example 1, in method 500, processor 68 receives 510 data representative of the fixed position 58 of EV-side electrical connector 38 relative to the position of center point C1 and/or the arrowhead of the pattern 72 of FIG. 4A. As shown in FIG. 4A, a QR code 131 positioned on or in landing zone 74 in a least one location thereof is captured 502 in image 70. Data encoded by the QR code 131 (or, additionally, or instead, a bar code, RFID tag, or NFC tag) is read by processor 68 performing the receiving 510 step and stored in memory 102 for subsequent use in method 500, as disclosed herein. The data encoded by QR code 131 includes a value of distance D1 from the center point C to the fixed position 58 of EV-side electrical connector 38 along the longitudinal axis 63.

Processor 68 uses the image processing algorithm(s) to determine 512 a value of angle 90 (e.g., A2, as shown in FIG. 4A) of a longitudinal axis 135 of the image 70 through a center of the image 70 with respect to the EV 4 longitudinal axis 63 on which distance D1 runs. The determined 512 value of A2 is stored in memory 102 for subsequent use in method 500. In Example 1, the longitudinal axis 135 of image 70 corresponds to a longitudinal axis of camera 62 field of view 66, which is co-linear with, or parallel to, a longitudinal axis of charger link 51 and charger-side electrical connector 34 in the initial position 78.

Referring to FIGS. 2A and 2B, processor 68 determines 504 the displacement 76 using, at least in part, the image processing algorithm(s) described herein. In Example 1, processor 68 first determines 518 a first displacement 96 for first actuating 522 the charger-side electrical connector 34 from the initial position 78 to an intermediate position 97. The intermediate position 97 corresponds to the charger-side electrical connector 34 at least partly abutting the landing zone 74 of vehicle unit 16 at the center point C1 of the pattern 72 of FIG. 4A. As shown in FIG. 2A, the charger link 51 is rotatably coupled to the charger-side electrical connector 34 by way of a pivot joint 61. The processor 68 first determines 518 the first displacement 96 such that the charger-side electrical connector 34 arrives at, and flushly abuts, the landing zone 74 at the pattern 72 center point C1. The first displacement 96 in Example 1 is an angular displacement effected by processor 68 using actuator 56 to cause a torque to be applied to the proximal end 54 of charger link 51. The first determined 518 first displacement 96 includes a linear distance (e.g., d1, as shown in FIG. 2A) and a corresponding angle (e.g., A1, as shown in FIG. 2A). Upon reaching the intermediate position 97, charger-side electrical connector 34 rotates with pivot joint 61 to a landing zone 74 abutting position and a spring or pistol (e.g., compliance device 55) positioned between separate distal 52 and proximal 54 portions of charger link 51 is compressed. This compression is sensed by sensor(s) (not shown) or may be indicated via a change in electric current consumption and/or electric power output by actuator, since the abutting of connector 34 with landing zone 74 will cause more friction as compared to charger link 51 and connector 34 traversing through free space. Such a change in current consumption and/or power consumption of actuator 56, and/or compression of compliance device 55, may form the basis, at least in part, of sensor(s) signaling the processor 68 that connector 34 has reached the intermediate position 97 at the center point C1 of the pattern 72 of FIG. 4A.

In Example 1, at least a second actuator 56 is positioned at in a least a portion of charger link 51 and/or a coupling point between link 51 and connector 34. The at least a second actuator 56 is capable of rotating charger-side electrical connector 34 by the angle A2 determined 512 by processor 68. In the example, the actuating 506 step includes processor 68 using the at least a second actuator 56 to rotate either or both of the charger link 51 and charger-side electrical connector 34 by the determined 512 angle A2 to align the longitudinal axis of the charger-side electrical connector 34 with the EV 4 longitudinal axis 63 along distance D1, thus completing the first actuating 522 step. A predetermined value or range of values for change in electric current consumption and/or electric power output by actuator 56, and/or compression of compliance device 55, may be stored in memory 102 for use by processor 68 in determining that connector 34 has reached the intermediate position 97.

Before, or concurrently with, completing the first actuating 522 step, in Example 1, processor 68 second determines 520 a second displacement 98 for second actuating 524 the charger-side electrical connector 34 from the intermediate position 97 to the final position 80. As shown in FIGS. 2A, 2B and 4A, the second displacement 98 is an angular displacement for the charger link 51 and is a linear displacement for the charger-side electrical connector 34, both of which are effected by the actuator 56 operably coupled to the link 51 proximal end 54 causing a torque to be applied to the proximal end 54. The second determined 520 second displacement 98 includes a linear distance (e.g., d2=D1, as shown in FIGS. 2A and 4A) and a corresponding angle (e.g., A2, as shown in FIGS. 2A and 4A). Over the course of the second displacement 98, the charger-side electrical connector 34 rotates with the pivot joint 61 as it continues to abut the landing zone 74 on its way toward EV-side electrical connector 38 along distance D1 and with, for instance, the angle A2 made to equal to zero degrees. In Example 1, processor 68 second determines 520 the second displacement 98 by reading the known, predetermined distance D1 received 510 as data and stored in memory 102. As the connector 34 moves along landing zone 74, compression of compliance device 55 and/or current consumption and/or power output of actuator 56 will continue to change up to a point representative of connector 34 reaching the final position 80. This further change in current consumption and/or power consumption of actuator 56, and/or compression of compliance device 55, may form the basis, at least in part, of sensor(s) signaling the processor 68 that connector 34 has reached the final position 80. A predetermined value or range of values for this further change in electric current consumption and/or electric power output by actuator 56, and/or compression of compliance device 55, may be stored in memory 102 for use by processor 68 in determining that connector 34 has reached the final position 80. In Example 1, the overall actuated 506 displacement 76 is a vector sum of the first 96 and second 98 displacements, and determining 512 the angle 90 includes determining a first (e.g., A1) and at least a second (e.g., A2) angle for use by processor 68 in method 500.

Example 2

The pattern 72 including AprilTags 92 positioned on landing zone 74 of vehicle unit 16 is caused by processor 68 to be backlit upon the processor 68 determining that the charger-side electrical connector 34 is within the predetermined distance 95 from the EV-side electrical connector 38. The image of FIG. 4B is captured 502 concurrently with, or shortly after, the processor 68 causing the pattern 72 to be illuminated. Referring to FIG. 5, for this Example 2, in method 500, processor 68 receives 510 data representative of the fixed position 58 of EV-side electrical connector 38 relative to the position of one or more of the AprilTags 92, where the received 510 data is encoded by the AprilTags 92 themselves. This data is read by processor 68 performing the receiving 510 step and stored in memory 102 for subsequent use in method 500, as disclosed herein. The data encoded by the AprilTags 92 includes a value of distance d2 from, for instance, the point C2 shown in FIG. 4B to the fixed position 58 of EV-side electrical connector 38 along the longitudinal axis 63.

Processor 68 uses the image processing algorithm(s) to determine 512 a value of angle 90 (e.g., A2, as shown in FIG. 4B) of a longitudinal axis 135 of the image 70 through point C2 with respect to the EV 4 longitudinal axis 63 on which distance D1 runs. In the case of Example 2, A2=zero degrees. In Example 2, the longitudinal axis 135 of image 70 corresponds to a longitudinal axis of camera 62 field of view 66, which is co-linear with, or parallel to, a longitudinal axis of charger link 51 and charger-side electrical connector 34 in the initial position 78.

Referring to FIGS. 2A and 2B, processor 68 determines 504 the displacement 76 using, at least in part, the image processing algorithm(s) described herein. In Example 2, processor 68 first determines 518 a first displacement 96 for first actuating 522 the charger-side electrical connector 34 from the initial position 78 to an intermediate position 97. The intermediate position 97 corresponds to the charger-side electrical connector 34 at least partly abutting the landing zone 74 of vehicle unit 16 at the point C2 of the pattern 72 of FIG. 4B. As shown in FIG. 2B, the charger link 51 is rotatably coupled to the charger-side electrical connector 34 by way of pivot joint 61. The processor 68 first determines 518 the first displacement 96 such that the charger-side electrical connector 34 arrives at, and flushly abuts, the landing zone 74 at the pattern 72 at a planar region whose center is point C2, a shown in FIG. 4B. The first displacement 96 in Example 2 is an angular displacement effected by processor 68 using actuator 56 to cause a torque to be applied to the proximal end 54 of charger link 51. The first determined 518 first displacement 96 includes a linear distance (e.g., d1, as shown in FIG. 2A) and a corresponding angle (e.g., A1, as shown in FIG. 2A). In Example 2, upon reaching the intermediate position 97, charger-side electrical connector 34 need not be rotated since A2=zero degrees. In the intermediate positon 97 with connector 34 in a landing zone 74 abutting position, the compliance device 55 is compressed. This compression is sensed by sensor(s) (not shown) or may be indicated via a change in electric current consumption and/or electric power output by actuator, as described above with reference to Example 1. Such a change in current consumption and/or power consumption of actuator 56, and/or compression of compliance device 55, may form the basis, at least in part, of sensor(s) signaling the processor 68 that connector 34 has reached the intermediate position 97 at point C of the pattern 72 of FIG. 4B. A predetermined value or range of values for change in electric current consumption and/or electric power output by actuator 56, and/or compression of compliance device 55, may be stored in memory 102 for use by processor 68 in determining that connector 34 has reached the intermediate position 97.

Before, or concurrently with, completing the first actuating 522 step, in Example 2, processor 68 second determines 520 a second displacement 98 for second actuating 524 the charger-side electrical connector 34 from the intermediate position 97 to the final position 80. As shown in FIGS. 2A, 2B and 4B, the second displacement 98 is an angular displacement for the charger link 51 and is a linear displacement for the charger-side electrical connector 34, both of which are effected by the actuator 56 operably coupled to the link 51 proximal end 54 causing a torque to be applied to the proximal end 54. The second determined 520 second displacement 98 includes a linear distance (e.g., d2, as shown in FIGS. 2A and 4B) and a corresponding angle (e.g., A2=zero degrees, as shown in FIG. 4B). Over the course of the second displacement 98, the charger-side electrical connector 34 rotates with the pivot joint 61 as it continues to abut the landing zone 74 on its way toward EV-side electrical connector 38 along distance d2 and with the angle A2 equal to zero degrees. In Example 2, processor 68 second determines 520 the second displacement 98 by reading the known, predetermined distance d2 received 510 as data and stored in memory 102. As the connector 34 moves along landing zone 74, compression of compliance device 55 and/or current consumption and/or power output of actuator 56 will continue to change up to a point representative of connector 34 reaching the final position 80. This further change in current consumption and/or power consumption of actuator 56, and/or compression of compliance device 55, may form the basis, at least in part, of sensor(s) signaling the processor 68 that connector 34 has reached the final position 80. A predetermined value or range of values for this further change in electric current consumption and/or electric power output by actuator 56, and/or compression of compliance device 55, may be stored in memory 102 for use by processor 68 in determining that connector 34 has reached the final position 80. In Example 2, the overall actuated 506 displacement 76 is a vector sum of the first 96 and second 98 displacements, and determining 512 the angle 90 incudes determining a first (e.g., A1) and at least a second (e.g., A2) angle for use by processor 68 in method 500.

Example 3

The pattern 72 including fractal features 94 positioned on landing zone 74 of vehicle unit 16 is caused by processor 68 to be backlit upon the processor 68 determining that the charger-side electrical connector 34 is within the predetermined distance 95 from the EV-side electrical connector 38. The image of FIG. 4C is captured 502 concurrently with, or shortly after, the processor 68 causing the pattern 72 to be illuminated. Referring to FIG. 5, for this Example 3, in method 500, processor 68 receives 510 data representative of the fixed position 58 of EV-side electrical connector 38 relative to the position of one or more of the fractal features 94, where the received 510 data is encoded by the fractal features 94 themselves. This data is read by processor 68 performing the receiving 510 step and stored in memory 102 for subsequent use in method 500, as disclosed herein. The data encoded by the fractal features 94 includes a value of distance d2 from, for instance, the point C3 shown in FIG. 4C to the fixed position 58 of EV-side electrical connector 38.

Processor 68 uses the image processing algorithm(s) to determine 512 a value of angle 90 (e.g., A2, as shown in FIG. 4C) of a longitudinal axis 135 of the image 70 through point C3 with respect to the EV 4 longitudinal axis 63 on which distance d2 runs. In the case of Example 3, A2 is not equal to zero degrees. In Example 3, the longitudinal axis 135 of image 70 corresponds to a longitudinal axis of camera 62 field of view 66, which is co-linear with, or parallel to, a longitudinal axis of charger link 51 and charger-side electrical connector 34 in the initial position 78.

Referring to FIGS. 2A and 2B, processor 68 determines 504 the displacement 76 using, at least in part, the image processing algorithm(s) described herein. In Example 3, processor 68 first determines 518 a first displacement 96 for first actuating 522 the charger-side electrical connector 34 from the initial position 78 to an intermediate position 97. The intermediate position 97 corresponds to the charger-side electrical connector 34 at least partly abutting the landing zone 74 of vehicle unit 16 at the point C3 of the pattern 72 of FIG. 4C. As shown in FIG. 2B, the charger link 51 is rotatably coupled to the charger-side electrical connector 34 by way of pivot joint 61. The processor 68 first determines 518 the first displacement 96 such that the charger-side electrical connector 34 arrives at, and flushly abuts, the landing zone 74 at the pattern 72 at a planar region whose center is point C3 of FIG. 4C. The first displacement 96 in Example 3 is an angular displacement effected by processor 68 using actuator 56 to cause a torque to be applied to the proximal end 54 of charger link 51. The first determined 518 first displacement 96 includes a linear distance (e.g., d1, as shown in FIG. 2A) and a corresponding angle (e.g., A1, as shown in FIG. 2A). Upon reaching the intermediate position 97, instead of rotating charger-side electrical connector 34 to match a determined 512 value of angle A2, instead, in Example 3, actuator 56 is a multi-degree of freedom actuator 56 capable of moving charger link 51 and connector 34 is both longitudinal 63 and transverse 65 directions in a continuous, or near continuous, fashion, while also rotating charger link 51 as needed. In the intermediate positon 97 with connector 34 in a landing zone 74 abutting position, the compliance device 55 is compressed. This compression is sensed by sensor(s) (not shown) or may be indicated via a change in electric current consumption and/or electric power output by actuator, as described above with reference to Example 1. Such a change in current consumption and/or power consumption of actuator 56, and/or compression of compliance device 55, may form the basis, at least in part, of sensor(s) signaling the processor 68 that connector 34 has reached the intermediate position 97 at point C3 of the pattern 72 of FIG. 4C. A predetermined value or range of values for change in electric current consumption and/or electric power output by actuator 56, and/or compression of compliance device 55, may be stored in memory 102 for use by processor 68 in determining that connector 34 has reached the intermediate position 97.

Before, or concurrently with, completing the first actuating 522 step, in Example 3, processor 68 second determines 520 a second displacement 98 for second actuating 524 the charger-side electrical connector 34 from the intermediate position 97 to the final position 80. As shown in FIGS. 2A, 2B and 4C, the second displacement 98 is an angular displacement for the charger link 51 and is a linear displacement for the charger-side electrical connector 34, both of which are effected by the actuator 56 operably coupled to the link 51 proximal end 54 causing a torque to be applied to the proximal end 54. The second determined 520 second displacement 98 includes a linear distance (e.g., d2, as shown in FIGS. 2A and 4C) and a corresponding angle (e.g., A2, as shown in FIGS. 2A and 4C). Over the course of the second displacement 98, the charger-side electrical connector 34 rotates with the pivot joint 61 as it continues to abut the landing zone 74 on its way toward EV-side electrical connector 38 along distance d2. In Example 3, processor 68 second determines 520 the second displacement 98 by reading the known, predetermined distance d2 received 510 as data and stored in memory 102. As the connector 34 moves along landing zone 74, compression of compliance device 55 and/or current consumption and/or power output of actuator 56 will continue to change up to a point representative of connector 34 reaching the final position 80. This further change in current consumption and/or power consumption of actuator 56, and/or compression of compliance device 55, may form the basis, at least in part, of sensor(s) signaling the processor 68 that connector 34 has reached the final position 80. A predetermined value or range of values for this further change in electric current consumption and/or electric power output by actuator 56, and/or compression of compliance device 55, may be stored in memory 102 for use by processor 68 in determining that connector 34 has reached the final position 80. In Example 3, the overall actuated 506 displacement 76 is a vector sum of the first 96 and second 98 displacements, and determining 512 the angle 90 incudes determining a first (e.g., A1) and at least a second (e.g., A2) angle for use by processor 68 in method 500.

Example 4

In any of Examples 1-3, or in any of the embodiments of method 500 disclosed herein, the actuator(s) 56 operably coupled to the proximal end 54 of charger link 51 is or includes a multi-degree of freedom actuator 56, as described above with reference to Example 3. Referring to FIGS. 2A and 2B, in this Example 4, upon processor 68 determining 504 the displacement 76 in method 500 based on the captured 502 image(s) 70 and the received 510 data described above with reference to Examples 1-3, processor 68 uses the multi-DOF actuator(s) 56 to actuate 506 charger-side electrical connector 34 directly from the initial position 78 to the final position 80, without first actuating 522 connector 34 to the intermediate position 97.

In some embodiments, with the multi-DOF actuator(s) 56 included in ACD 8, actuating 506 connector 34 to a position at least partly abutting the landing zone 74 of vehicle unit 16 is not necessary. In this Example 4, for instance, the data encoded and/or otherwise contained in the at least a portion of the pattern 72 captured 502 as image(s) 70 and/or received 510 by processor 68 provides sufficient information to be used by processor 68 as input to the image processing algorithm(s) to output the displacement 76 for the direct and/or continuous actuation 506 of charger-side electrical connector 34 from the initial position 78 to the final position 80. In Example 4, the overall actuated 506 displacement 76 is an angular displacement including the determined 512 angle 84 and distance 95, as shown in FIG. 2B.

Example 5

Figure 6:
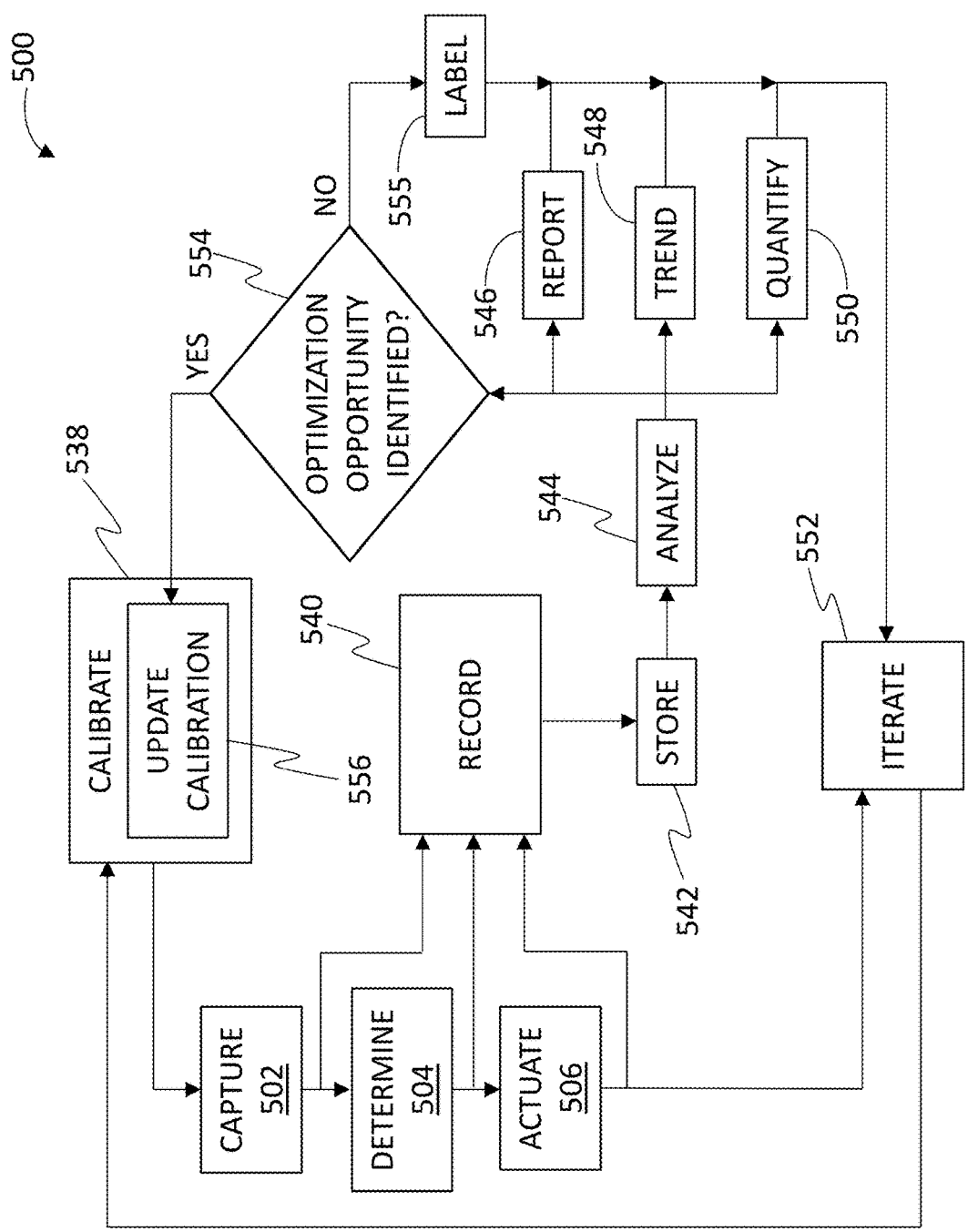
FIG. 6 is a flowchart of aspects of the method of FIG. 2 according to embodiments of the disclosure.

For each of the disclosed steps (e.g., capturing 502, determining 504, actuating 506, and others) of method 500, processor 68 of ACD 8 relies on various data transmitted or otherwise obtained from sensor(s) 77 and camera(s) 62. FIG. 6 is a flowchart of aspects of the method of FIG. 2 according to embodiments of the disclosure. Referring to FIG. 6, for this Example 5, in method 500, processor 68 retrieves 538 calibration data from memory 102 for use in one or more of the capturing 502, determining 504, actuating 506, and other steps of method 500. For instance, at or near a time of installation of ACD 8 in charging environment 2, an initial set of calibration data is stored in memory 102 for use by processor 68 in method 500. In an example, actuator(s) 56 include optical encoder(s) (not shown) operably coupled thereto so as to enable processor 68 to count rotations of, for example, an actuator 56 motor shaft and thereby translate rotation of the shaft to linear and/or angular displacement of charger link 51. In the example, the calibration data includes a factor assigned and stored in memory 102 for each of the ACD 8 actuator(s) 56 that is used by processor 68 to translate an encoder count to linear and/or angular displacement of charger link 51, or parts thereof. In another example, calibration data includes camera 62 settings, for example, and without limitation, focus, color (e.g., RGB), F-stop, zoom, and filtering settings. These calibration data are, under certain circumstances, specifically obtained for particular charging environments 2, EVs 4 and/or their respective vehicle units 16, and/or other physical characteristics related to the ACD 8, its particular components and configurations (e.g., as disclosed herein), and/or the facilities in which they are installed. In embodiments in which the retrieving 538 step of method 500 is performed, implemented, and/or facilitated, at least in part using software 106 or firmware, processor 68 executes program instructions stored as a calibration data retrieving module in the non-transitory computer-readable storage medium 104.

In Example 5, for method 500, processor 68 records 540 and stores 542 various data obtained from sensor(s) 77 and/or computed by processor 68 based on sensor 77 data. These operational data include data associated with performance of one or more of the capturing 502, determining 504, actuating 506, and other steps in method 500. For instance, data obtained by processor 68 for determining 518 the first displacement 96 in method 500 involves a macro registration of camera 62 to the features of pattern 72 and processor 68 records 540 and stores 542 in memory 102 the various sensor 77 (including, e.g., from the actuator 56 encoder(s)) along with any processor 68-computed results based on sensor 77 data (e.g., angles, distances, and first displacement 96 value(s), and/or the amount of time it took to complete the first actuating 522 step) necessary or otherwise useful for accomplishing the first determining 518 and first actuating 522 steps in method 500. Instead of, or in addition to, being stored in memory 102 of ACD 8, processor 68 may cause the recorded 540 data to be transmitted to memory resources at a location remote from ACD 8 (e.g., cloud storage). In embodiments in which the recording 540 and/or storing 542 step(s) of method 500 is/are performed, implemented, and/or facilitated, at least in part using software 106 or firmware, processor 68 executes program instructions stored as operational data recording and/or operational data storing module(s) in the non-transitory computer-readable storage medium 104.

By way of automated and/or manual procedures, either of which may be implemented and/or mediated by users, servicers, administrators, and/or software as a service (SaaS) providers of, or for the benefit of, ACD 8, processor 68 uses the recorded 540 and stored 542 data to various beneficial ends in method 500. For this purpose, in method 500, processor 68 analyzes 544 the recorded 540 and stored 542 data to determine and identify 554 whether or not an opportunity exists to optimize performance of one or more of the steps of method 500 as disclosed herein. In an embodiment, this determination and identification 554 step in method 500 makes uses of one or more metrics that are either formulated over time (e.g., using, at least in part, machine learning techniques), or are predetermined for the ACD 8 during design, manufacture, and/or installation. In any event, the metrics are stored in memory 102 for use by processor 68 in method 500. Such metrics may include, for example and without limitation, accuracy, precision, and speed, among other operational attributes that may be useful for evaluating ACD 8 performance in method 500. For instance, in a first operational sequence of performance of method 500, processor 68 determines 554, based on recorded 540 and stored 542 operational data for the first actuating 522 step, that the accuracy and precision with which the charger-side electrical connector 34 was first actuated 522 to the landing zone 74 in the pattern 72 macro level registration using camera 62 and the above-described image processing algorithm(s) was within an optimal level of accuracy and precision, but that the speed at which the first actuating 522 was performed could be improved by a factor of, for example, 1.15 (e.g., processor 68 implements a 15% increase in speed for the control scheme in at least a second method 500 operational sequence to facilitate meeting, or at least improving, the speed metric for the first actuating 522 step). Likewise, for the first operational sequence of method 500, processor 68 determines 554, based on recorded 540 and stored 542 operational data for the second actuating 524 step, that the accuracy with which the charger-side electrical connector 34 was second actuated 524 to the EV-side electrical connector 38 in a micro (e.g., fine) level registration of camera 62 to pattern 72 features was sub-optimal, and thus the speed at which the second actuating 524 is performed should be decreased by a factor of 0.98 (e.g., processor 68 implements a 2% decrease in speed for the control scheme in at least a second method 500 operational sequence to facilitate meeting, or at least improving, the accuracy metric for the second actuating 524 step). In an embodiment, processor 68 causes the results of computations performed during the analyzing 544 and/or the determining/identifying 554 steps to be stored in memory 102. In embodiments in which the analyzing 544 and/or determining/identifying 554 step(s) of method 500 is/are performed, implemented, and/or facilitated, at least in part using software 106 or firmware, processor 68 executes program instructions stored as operational data analysis and/or operational optimization module(s) in the non-transitory computer-readable storage medium 104.

In cases where processor 68 identifies 554 an opportunity to optimize one or more aspects of operation of ACD 8 in method 500, processor 68 updates 556 the calibration data for the calibrating step 538 according to the results of the analyzing 544 step, thereby updating 556 the calibration data for use in method 500, including for one or more of the capturing 502, determining 504, and actuating 506 steps. Otherwise, where processor 68 does not determine and identify 554 such an optimization opportunity in method 500, processor 68 causes the recorded 540 and stored 542 operational data for a respective operational sequence of method 500 to be labeled 555 in memory 102 as a successful (e.g., meeting or exceeding the performance metric(s)) method 500 operational sequence. An identifier of the ACD 8 (e.g., serial number), the EV 4 driver, and/or the EV 4 for which ACD 8 was used for the successful method 500 operational sequence may also be labeled 555 in memory 102 for the respective operational data set. Then, processor 68 iterates 552 through method 500 by, for example, waiting for another method 500 operational sequence including steps 502, 504 and 506 for charging an EV 4 using ACD 8. In embodiments in which the iterating 552 step of method 500 is performed, implemented, and/or facilitated, at least in part using software 106 or firmware, processor 68 executes program instructions stored as an iterating module in the non-transitory computer-readable storage medium 104.

In Example 5, for method 500, the operational data generated, or otherwise provided, through performance of the analyzing 544 step, and in some embodiments, the determining/identifying 554 step, are stored locally in ACD 8 memory 102 and/or using remote (e.g., cloud) memory storage resources, and such data may be retrieved periodically when, for instance, scheduled ACD 8 servicing is performed. These data are used by processor 68 and/or remote (e.g., cloud) computing resources for generating 546 ACD 8 operational reports, performing 548 trending of ACD 8 operation data, and quantifying 550 ACD 8 user and/or EV 4 driver behavior and/or habits (e.g., operational and/or behavioral operational data). For instance, users of ACD 8 may receive generated 546 reports providing indications of corrective actions or maintenance for ACD 8 and/or aspects of vehicle unit 16 in response to certain EVs 4 in their fleet (or their respective drivers) experiencing recurring operational issues. Identifying such issues using generated 546 reports may facilitate ACD 8 user and/or EV 4 training initiatives, as well as aid in keeping the one or more EVs 4 using ACD(s) 8 operational in an efficient and continuous manner. In embodiments in which the generating 546, performing 548 and/or quantifying 550 step(s) of method 500 is/are performed, implemented, and/or facilitated, at least in part using software 106 or firmware, processor 68 executes program instructions stored as reporting, trending, and/or quantifying module(s) in the non-transitory computer-readable storage medium 104.

Performing 548 trending of ACD 8 operational data can similarly aid in establishing maintenance and/or training regimes for ACD 8 users and/or EV 4 drivers. Since operational data recorded 540 and stored 542 in method 500 is made available for performing 548 trending, and since these data are analyzed 544, at least in part, with respect to metrics, specific ACD 8 components may be identified as requiring maintenance (e.g., cleaning camera 62 lens or an inlet of EV-side electrical connector 38) before problems occur that may cause ACD 8 to be inoperable or require removal for off-site servicing. Performing 548 trending for such purposes is especially advantageous to ACD 8 users when employed in conjunction with regularly scheduled ACD 8 and EV 4 preventative maintenance routines. Quantifying 550 ACD 8 user and/or EV 4 driver behavior and/or habits facilitates developing an understanding of operational aspects of the ACD 8 customer base, EV 4 fleets, and/or EV 4 drivers to inform further developments in the ACD 8, its operating software 106, and/or individual ACD 8 components and/or software 106 modules. As disclosed, for instance, in Example 5, the beneficial outcomes provided by the recording 540, storing 542, analyzing 544, determining/identifying 554, updating 556, generating 546, performing 548, quantifying 550 and iterating 552 steps of method 500 enable continuous improvement of ACD 8 control schemes to dynamically address environmental, behavioral, and operational concerns to provide optimized performance with respect to the ACD 8 metrics (e.g., connection accuracy and precision, timing, number of attempts, movement times, and the actual commands issued by the processor 68).

In summary, in accordance with Example 5, method 500 includes recording 540, and storing 542 in memory (e.g., ACD 8 memory 102) operational data associated with performance of the disclosed method 500 steps, including one or more of the: capturing 502, determining 504, and actuating 506, steps of the method 500. The method 500 includes analyzing 544 the stored 542 operational data to determine/identify 554, based on the stored 542 operational data, whether or not an opportunity exists to optimize performance of the disclosed method 500 steps, including one or more of the: capturing 502, determining 504, and actuating 506, steps of the method 500. If, during the determining/identifying 554 step, such an optimization opportunity is determined/identified 554 to exist, then method 500 proceeds to update 556 calibration data for use in the disclosed method 500 steps, including one or more of the: capturing 502, determining 504, and actuating 506, steps of the method 500, according to a result of the analyzing 544 step. Otherwise, if, during the determining/identifying 554 step, no such optimization opportunity is determined/identified 554 to exist, then method 500 proceeds to label 555 the stored 542 operational data in memory (e.g., ACD 8 memory 102) as a successful operational sequence for the method 500. Result(s) of analyzing 544 the stored 542 operational data facilitates performance of at least one of the following steps in method 500: generating 546 an operational report according to the result(s) of the analyzing 544 step; performing 548 trending of the stored 542 operational data according to the result(s) of the analyzing 544 step; and quantifying 550 operational and/or behavioral operational data according to the result(s) of the analyzing 544 step.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

Embodiments of the present disclosure are described with reference to the flowcharts and/or block diagrams of the method, the device (system), and the computer program product according to the embodiments described herein. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus or module. The instruction apparatus or module implements a specific function in one or more processes in the flowcharts and/or in one or more blocks in the block diagrams.

These computer program instructions may be loaded onto a computer or another programmable data processing device, so that a series of operations and steps are performed on the computer or other programmable device, thereby generating computer-implemented processing. Therefore, the instructions executed on the computer or other programmable device provide steps for implementing a specific function in one or more processes in the flowcharts and/or in one or more blocks in the block diagrams.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A computer-implemented method for charging an electric vehicle (EV), comprising:
    capturing an image of at least a portion of a pattern positioned in a fixed location in a landing zone of an EV-side electrical connector in a fixed position on or in an underside of the EV;
    determining, based on the image, a displacement of a charger-side electrical connector from an initial position to a final position, the final position corresponding to the charger-side electrical connector matingly engaged with the EV-side electrical connector;
    actuating the charger-side electrical connector by sliding the charger-side connector along a surface of the landing zone from the initial position to the final position according to the displacement;
    further comprising storing in memory operational data associated with performance of one or more of the: capturing, determining, and actuating, steps of the method; and
    analyzing the stored operational data to determine, based on the stored operational data, whether or not an opportunity exists to optimize performance of the one or more of the: capturing, determining, and actuating, steps of the method; and
    if the opportunity exists, then:
        updating calibration data for use in the one or more of the: capturing, determining, and actuating, steps of the method according to a result of the analyzing step,
    else:
    labelling the stored operational data in memory as a successful operational sequence for the method.

2. The computer-implemented method of claim 1 further comprising determining that the EV-side electrical connector is within a predetermined distance from the charger-side electrical connector.

3. The computer implemented method of claim 1 further comprising causing the pattern to be illuminated to facilitate capturing the image.

4. The computer-implemented method of claim 1, wherein determining the displacement comprises:
    determining a first displacement of the charger-side electrical connector from the initial position to an intermediate position, the intermediate position corresponding to the charger-side electrical connector abutting the landing zone; and
    determining a second displacement of the charger-side electrical connector from the intermediate position to the final position.

5. The computer-implemented method of claim 4, wherein actuating the charger-side electrical connector from the initial position to the final position comprises:
    first actuating the charger-side electrical connector from the initial position to the intermediate position according to the first displacement; and
    second actuating the charger-side electrical connector from the intermediate position to the final position according to the second displacement.

6. The computer-implemented method of claim 1, wherein the charger-side electrical connector is electrically coupled to a power source positioned outside of the EV, and wherein, after actuating the charger-side electrical connector from the initial position to the final position, the method further comprises initiating an EV charging process by selectively enabling a flow of electric current from the power source through the matingly engaged charger-side and EV-side electrical connectors to a power storage device of the EV.

7. The computer-implemented method of claim 6 further comprising actuating the charger-side electrical connector from the final position to the initial position in response to a presence of one or more conditions representative of completion of the EV charging process.

8. The computer-implemented method of claim 1 further comprising analyzing the stored operational data to facilitate at least one of:
  generating an operational report according to a result of the analyzing step;
  performing trending of the stored operational data according to the result of the analyzing step; and
  quantifying operational and/or behavioral data according to a result of the analyzing step.

9. A non-transitory computer-readable storage medium having stored thereon program instructions which, when executed by one or more processors of an automatic charging device (ACD) for an electric vehicle (EV), cause the ACD to:
  capture an image of at least a portion of a pattern positioned in a fixed location in a landing zone of an EV-side electrical connector in a fixed position on or in an underside of the EV;
  determine, based on the image, a displacement of a charger-side electrical connector from an initial position to a final position, the final position corresponding to the charger-side electrical connector matingly engaged with the EV-side electrical connector;
  actuate the charger-side electrical connector by sliding the charger-side connector along a surface of the landing zone from the initial position to the final position according to the displacement;
  further comprising storing in memory operational data associated with performance of one or more of the: capturing, determining, and actuating, steps of the method;
  analyzing the stored operational data to determine, based on the stored operational data, whether or not an opportunity exists to optimize performance of the one or more of the: capturing, determining, and actuating, steps of the method; and
  if the opportunity exists, then:
    updating calibration data for use in the one or more of the: capturing, determining, and actuating, steps of the method according to a result of the analyzing step,
  else:
  labelling the stored operational data in memory as a successful operational sequence for the method.

10. The non-transitory computer-readable storage medium of claim 9, wherein:
  when executed by the one or more processors, the program instructions further cause the ACD to determine that the EV is stationary; and
  when executed by the one or more processors for capturing the image, the program instructions further cause the ACD to capture the image in response to determining that the EV is stationary.

11. The non-transitory computer-readable storage medium of claim 9, wherein, when executed by the one or more processors, the program instructions further cause the ACD to:
  determine that the EV is stationary; and
  capture the image in response to determining that the EV is stationary.

12. The non-transitory computer-readable storage medium of claim 9, wherein, when executed by the one or more processors, the program instructions further cause the ACD to:
  determine that the EV-side electrical connector is within a predetermined distance of the charger-side electrical connector; and
  cause the pattern to be illuminated to facilitate capturing the image in response to determining that the EV-side electrical connector is within the predetermined distance of the charger-side electrical connector.

13. The non-transitory computer-readable storage medium of claim 9, wherein, when executed by the one or more processors, the program instructions further cause the ACD to:
  determine a presence of one or more conditions representative of completion of an EV charging process; and
  actuate the charger-side electrical connector from the final position to the initial position in response to determining the presence of the one or more conditions representative of completion of the EV charging process.

\* \* \* \* \*